(12) United States Patent
Hu et al.

(10) Patent No.: US 11,067,822 B2
(45) Date of Patent: Jul. 20, 2021

(54) OPTICAL SYSTEM

(71) Applicant: TDK TAIWAN CORP., Taoyuan (CN)

(72) Inventors: Chao-Chang Hu, Taoyuan (TW);
Shao-Kuang Huang, Taoyuan (TW);
Shu-Shan Chen, Taoyuan (TW);
Chih-Wei Weng, Taoyuan (TW)

(73) Assignee: TDK TAIWAN CORP., Tao Yuan (TW)

( * ) Notice: Subject to any disclaimer, the term of this patent is extended or adjusted under 35 U.S.C. 154(b) by 358 days.

(21) Appl. No.: 16/007,662

(22) Filed: Jun. 13, 2018

(65) Prior Publication Data

US 2018/0356647 A1 Dec. 13, 2018

Related U.S. Application Data

(60) Provisional application No. 62/518,753, filed on Jun. 13, 2017.

(30) Foreign Application Priority Data

May 31, 2018 (CN) .......................... 201820837575.2

(51) Int. Cl.
*G02B 27/64* (2006.01)

(52) U.S. Cl.
CPC ................................ *G02B 27/646* (2013.01)

(58) Field of Classification Search
CPC .... G02B 27/64; G02B 27/646; G02B 27/642; G02B 27/644; G02B 7/00; G02B 7/09; G02B 7/08; G02B 7/02; G02B 7/04; G02B 7/10; G02B 7/102; G03B 5/04; G03B 5/00; G03B 3/10; G03B 2217/005; H04N 5/225; H04N 5/232; H04N 5/2257; H04N 5/23248; H04N 5/23287; H04N 5/2328
USPC ....... 359/557, 554, 677, 683, 813, 814, 819, 359/823, 824; 396/52–55
See application file for complete search history.

(56) References Cited

U.S. PATENT DOCUMENTS

| | | | |
|---|---|---|---|
| 2015/0226978 A1* | 8/2015 | Sugawara | G03B 13/36 359/557 |
| 2016/0103331 A1* | 4/2016 | Lee | G02B 7/08 359/557 |

* cited by examiner

*Primary Examiner* — Jie Lei

(74) *Attorney, Agent, or Firm* — Muncy, Geissler, Olds and Lowe, P.C.

(57) ABSTRACT

An optical system is provided and includes a fixed module, a movable module, a sensing unit and a driving assembly. The fixed module includes a base, and the movable module includes an optical member holder, configured to hold an optical member. The sensing unit is configured to obtain information related to a first rotation angle of the optical member holder when rotating around a first axis relative to the base and a second rotation angle of the optical member holder when rotating around a second axis relative to the base. The driving assembly includes a coil, the coil and the movable module are arranged along an optical axis of the optical member, and the coil is disposed around an opening of the base. The first axis or the second axis is perpendicular to the optical axis.

15 Claims, 15 Drawing Sheets

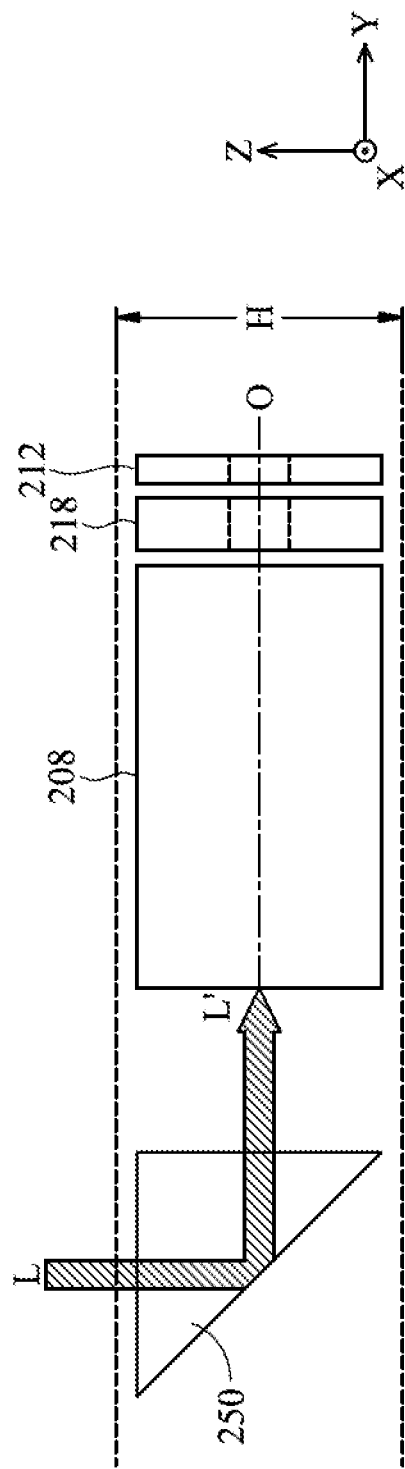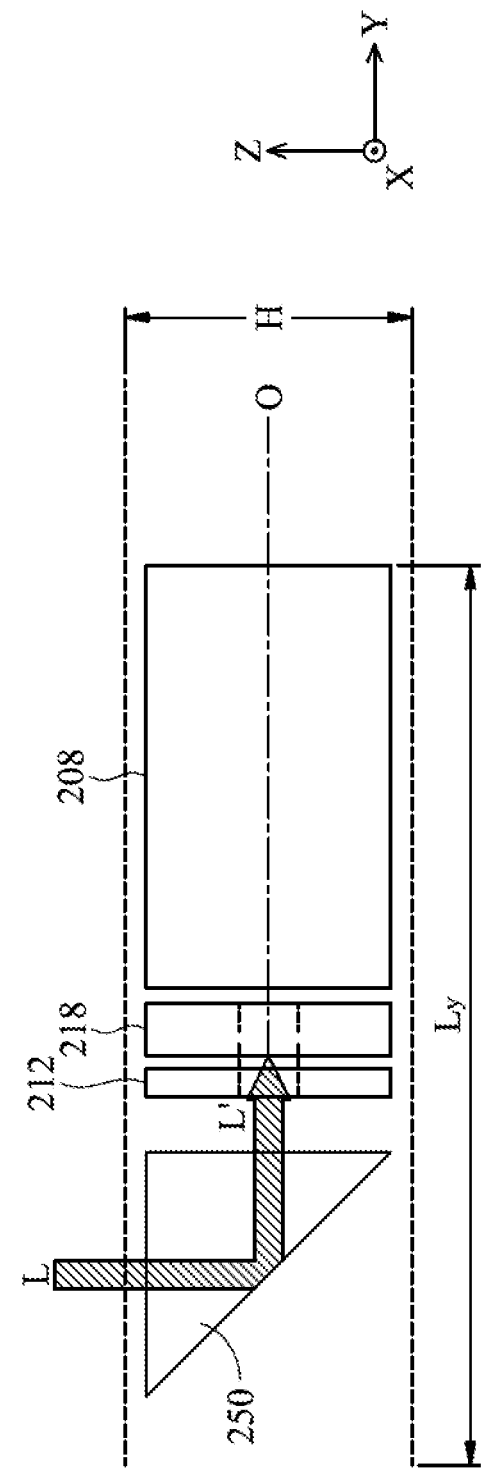

OPTICAL SYSTEM

CROSS REFERENCE TO RELATED APPLICATIONS

This application claims the benefit of U.S. Provisional Application No. 62/518,753, filed on Jun. 13, 2017, and China Patent Application No. 201820837575.2, filed on May 31, 2018, the entirety of which are incorporated by reference herein.

BACKGROUND OF THE DISCLOSURE

Field of the Disclosure

The present disclosure relates to an optical system, and more particularly to an optical system that can compensate for static tilt and dynamic tilt.

Description of the Related Art

As technology has progressed, many kinds of electronic devices such as smartphones and tablet computers have begun to include the functionality of digital photography and recording video. A user can operate the electronic device to capture various images through a camera module included in the electronic device.

In general, when using the electronic device, the camera module therein can vibrate due to external shock or impact, which can blur the images captured by the camera module. Therefore, the camera module of the electronic device can have such functions as auto focusing and optical image stabilization. When the auto focusing function is executed, a current is supplied to the coil, and electromagnetic induction occurs between the coil and the corresponding magnets, so that a lens holder affixed to the coil is moved along an optical axis (i.e. along the Z direction) of the lens, thereby performing an auto focusing function. Moreover, electromagnetic induction can also occur between the coils and the magnets, corresponding to the X-axis and Y-axis directions, to correct the position of the lens (i.e. correct the horizontal offset of the optical axis in the X-axis and Y-axis directions). Consequently, the electronic device is shockproof and image quality is improved.

However, when a conventional electronic device is used, the vibration of the camera module therein is actually more complicated, rather than being offset along the vertical direction and the horizontal direction. Therefore, how to design an electronic device and a camera module with better shockproof effect is a topic nowadays that needs to be discussed and solved.

BRIEF SUMMARY OF THE DISCLOSURE

Accordingly, one objective of the present disclosure is to provide an optical system, to solve the above problems.

According to some embodiments of the disclosure, an optical system includes a fixed module, a movable module, a sensing unit and a driving assembly. The fixed module includes a base, and the movable module includes an optical member holder, configured to hold an optical member. The sensing unit is configured to obtain information related to a first rotation angle of the optical member holder when rotating around a first axis relative to the base and a second rotation angle of the optical member holder when rotating around a second axis relative to the base. The driving assembly includes a coil, the coil and the movable module are arranged along an optical axis of the optical member, and the coil is disposed around an opening of the base. The first axis or the second axis is perpendicular to the optical axis.

According to some embodiments, the driving assembly generates a driving force according to the information related to first rotation angle and the second rotation angle, to drive the optical member holder to rotate around the first axis or the second axis. In addition, the driving force is substantially perpendicular to the optical axis.

According to some embodiments, the optical system further includes an elastic member and a frame, the elastic member includes an inner ring portion, a middle ring portion and an outer ring portion, the inner ring portion is connected to the optical member holder, the middle ring portion is connected to the frame, and the outer ring portion is connected to the fixed module. The inner ring portion and the middle ring portion rotate relative to the outer ring portion around the first axis or the second axis.

According to some embodiments, the base includes a rectangular structure, and the driving assembly is disposed at the corner of the base. In addition, the driving assembly further includes a magnetic element disposed at the corner of the base, and the magnetic element includes a triangular prism structure.

According to some embodiments, the fixed module further includes a fixed frame, and the optical system further includes a frame, and the fixed frame partially overlaps the frame when viewed along the optical axis. In addition, the first axis and the second axis pass through the optical member holder.

According to some embodiments, the driving assembly further includes a driving coil, disposed around the optical member holder. In addition, the driving assembly further includes two magnetic elements which are disposed on one side of the optical member holder, and the coil is disposed on the side and is located between the two magnetic elements. In addition, the driving assembly is configured to generate a driving force which is parallel to the optical axis.

According to some embodiments, the optical system further includes an optical axis adjustment member which is configured to change an incident light to a direction parallel to the optical axis, the optical axis adjustment member and the base are arranged along the optical axis, and the incident light is not parallel to the optical axis. In addition, the base is disposed between the movable module and the optical axis adjustment member.

According to some embodiments, the driving assembly further includes at least one magnetic element, and the magnetic element includes a long-strip structure. In addition, the magnetic element is a multi-pole magnet.

The present disclosure provides an optical system including a sensing unit, a driving assembly and a control unit. When the optical member holder is tilted relative to the image-sensing element (e.g., the tilting of the optical system is resulting from a shaking or the mechanical tolerances), the optical axis of the optical member holder may not be aligned with the optical axis of the image-sensing element. At this time, the sensing unit can obtain information related to the first rotation angle of the optical member holder when rotating around the first axis and/or the second rotation angle of the optical member holder when rotating around the second axis, and then the control unit can control the driving assembly to drive the optical member holder to rotate according to the information, to compensate for the angle of tilt.

In some embodiments of the present disclosure, the optical member holder has a rectangular structure, and the first magnetic elements and the second magnetic elements of the driving assembly are disposed at four sides of the optical member holder. Based on this structural configuration, the driving assembly can provide a greater electromagnetic driving force to drive the optical member holder to move or to drive the optical member holder and the frame to rotate relative to the fixed module. In other embodiments of the present disclosure, when the optical system needs to hold a larger optical member, the optical member holder can be designed to have an octagonal structure, and the first magnetic elements and the second magnetic elements of the driving assembly are disposed at four corners of the optical member holder, so that the optical member holder can hold a larger optical member.

In addition, in some embodiments, the design of the present disclosure can also be applied to a periscope optical system. In these embodiments, because the plate coil is disposed between the optical member holder and the base, the height of the optical system along the Z-axis direction can be reduced, so as to achieve the purpose of miniaturization. In addition, in other embodiments, the base and the plate coil are disposed between the optical axis adjusting member (the reflecting mirror) and the optical member holder. Based on this configuration, the length of the optical system can be further reduced, to further achieve the purpose of miniaturization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

FIG. 15 shows a side view of an optical system according to another embodiment of the present disclosure.

FIG. 16 shows a side view of an optical system according to another embodiment of the present disclosure.

DETAILED DESCRIPTION OF THE ILLUSTRATIVE EMBODIMENTS

Figure 1:
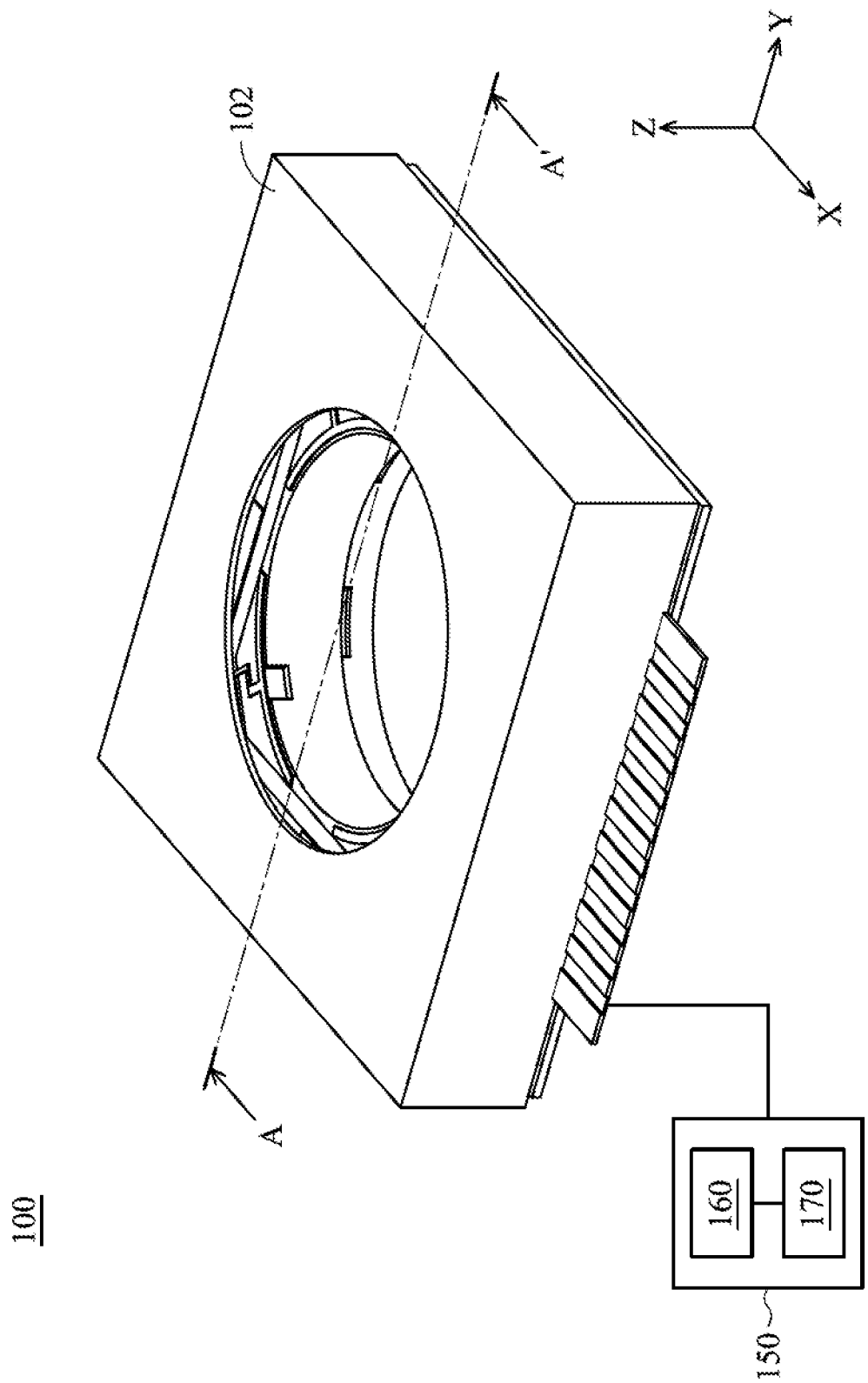
FIG. 1 shows a schematic diagram of an optical system according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
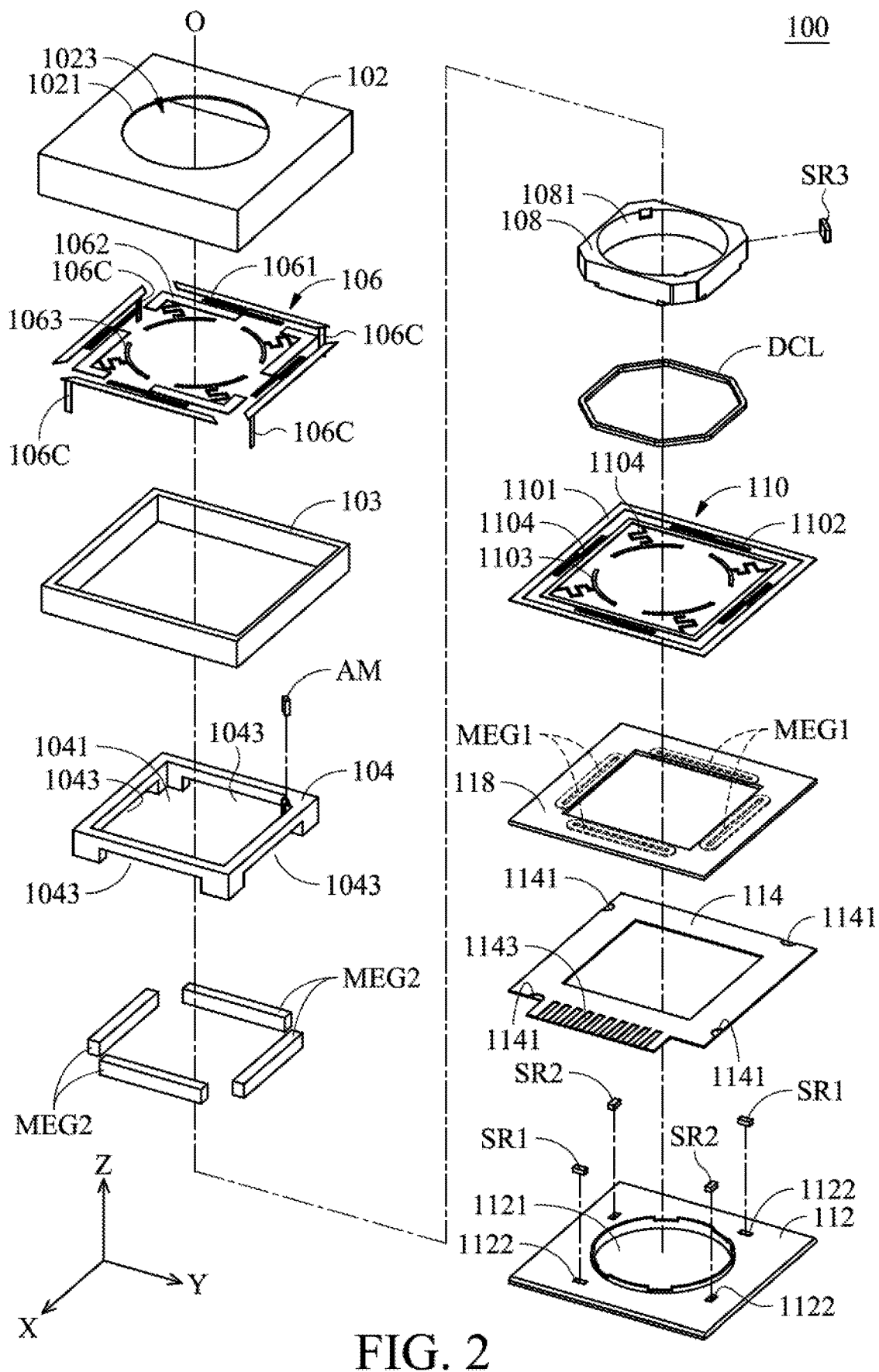
FIG. 2 shows an exploded diagram of the optical system according to the embodiment of the present disclosure.
Figure 3:
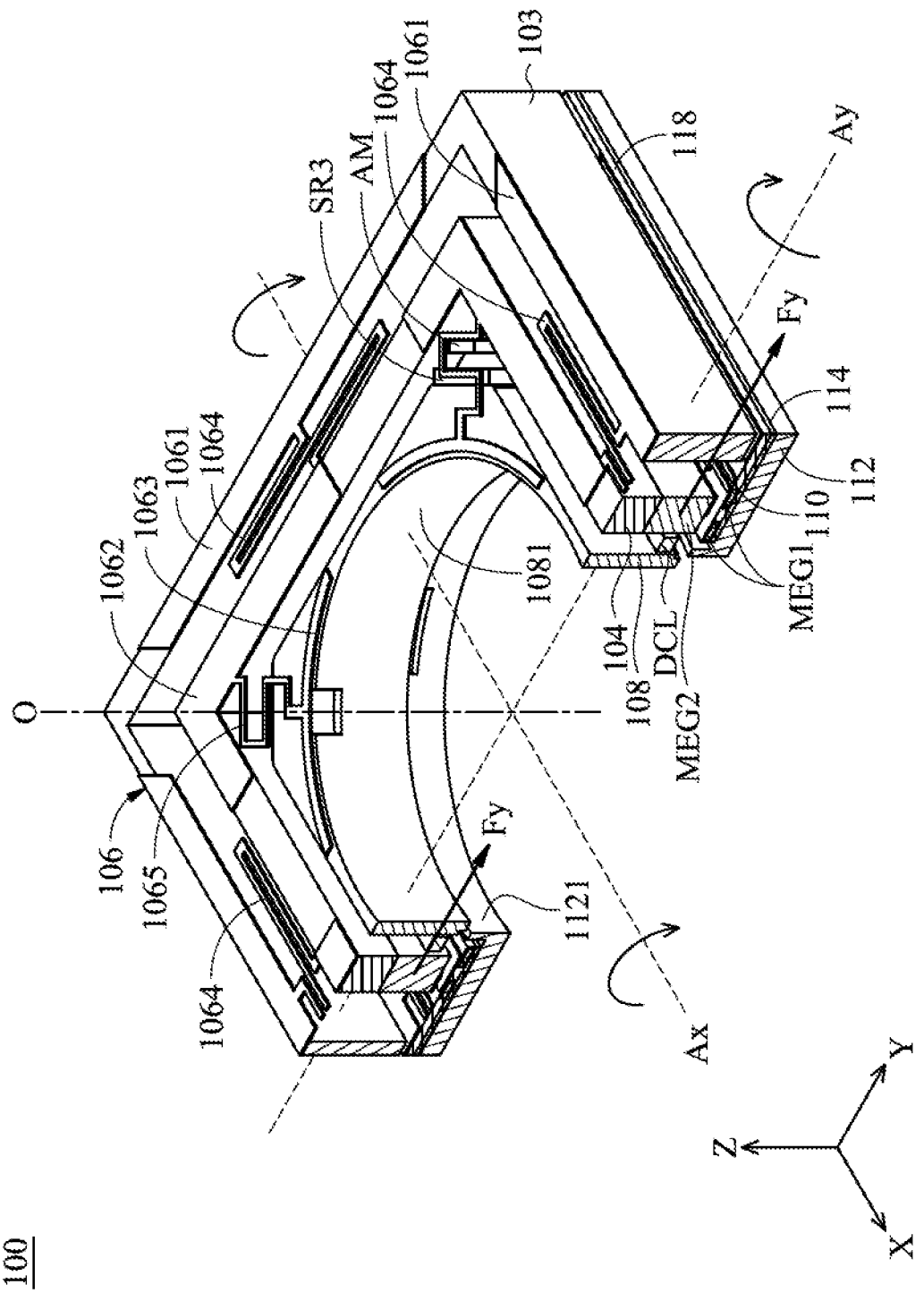
FIG. 3 shows a cross-sectional view along line A-A' in FIG. 1 according to the embodiment of the present disclosure.

Please refer to FIG. 1 to FIG. 3. FIG. 1 shows a schematic diagram of an optical system 100 according to an embodiment of the present disclosure, FIG. 2 shows an exploded diagram of the optical system 100 according to the embodiment of the present disclosure, and FIG. 3 shows a cross-sectional view along line A-A' in FIG. 1 according to the embodiment of the present disclosure. The optical system 100 can be a camera system with a driving assembly and can be configured to hold an optical member (such as a lens, not shown in the figures). The optical system 100 can be installed in different electronic devices or portable electronic devices, such as a smartphone or a tablet computer, for allowing a user to perform the image capturing function. In this embodiment, the driving assembly can be a voice coil motor (VCM) with an auto-focusing (AF) function, but it is not limited thereto. In some embodiments, the driving assembly of the optical system 100 can also perform the functions of auto-focusing, static tilt compensation and dynamic tilt compensation.

In addition, as shown in FIG. 1, the optical system 100 can also include a control unit 150. The control unit 150 can include a processor 160 and a storage unit 170. In this embodiment, the processor 160 can be a microprocessor, and the storage unit 170 can be any form of storage medium (such as random access memory) for storing data related to the optical system 100. The processor 160 in the control unit 150 is configured to control the driving assembly mentioned above according to the data stored in the storage unit 170. The control unit 150 is not limited to the implementation means described above. For example, the control unit 150 can also be a control chip.

Please refer to FIG. 1 to FIG. 3 together. In this embodiment, as shown in FIG. 2, the optical system 100 includes an casing 102, a fixed frame 103, a frame 104, a top spring sheet 106, an optical member holder 108, a driving coil DCL, a lower spring sheet 110, a plurality of first magnetic elements MEG1, a plurality of second magnetic elements MEG2, a sensing unit, a circuit board 114, a circuit board 118 and a base 112 (the control unit 150 is omitted in FIG. 2). In this embodiment, the fixed frame 103, the casing 102, the circuit board 114, the circuit board 118 and the base 112 can collectively form a fixed module. In addition, the fixed frame 103 can be securely connected to the circuit board 118 and the circuit board 114, for example, by glue, but it is not limited thereto. Mover, the optical member holder 108 and frame 104 can collectively form a movable module, and the movable module can move relative to the fixed module.

As shown in FIG. 2, the casing 102 has a hollow structure, and an opening 1021 is formed on the casing 102. In addition, a base opening 1121 is formed on the base 112. The center of the opening 1021 corresponds to an optical axis O of an optical member (now shown) which is held by the optical member holder 108, and the base opening 1121 corresponds to the image-sensing element (not shown) disposed below the base 112. The casing 102 can have an accommodating space 1023 for accommodating the top spring sheet 106, the fixed frame 103, the frame 104, the optical member holder 108, the driving coil DCL, the second magnetic elements MEG2, the circuit board 118 and the circuit board 114. In this embodiment, the driving coil DCL, the first magnetic elements MEG1 and the second magnetic elements MEG2 corresponding to the first magnetic elements MEG1 can be defined as the driving assembly. The driving assembly is electrically connected to the circuit board 114, and the driving assembly is configured to drive the optical member holder 108 to move relative to the frame 104. For example, the optical member holder 108 can move along the optical axis O or rotate around a first axis Ax and a second axis Ay which are located between the top spring sheet 106 and the lower spring sheet 110 (FIG. 3).

As shown in FIG. 2, the optical member holder 108 has a hollow ring structure and has a through hole 1081. The through hole 1081 forms a threaded structure (not shown) corresponding to another threaded structure (not shown) on the optical member, so that the optical member can be locked in the through hole 1081. Furthermore, as shown in FIG. 2, in this embodiment, the frame 104 has an opening 1041 and a plurality of grooves 1043. The opening 1041 is configured to accommodate the optical member holder 108, and the grooves 1043 are configured to accommodate the four second magnetic elements MEG2. However, the number of the grooves 1043 and the second magnetic elements MEG2 is not limited to this embodiment. In this embodiment, the shape of the second magnetic element MEG2 can include a long-strip structure, but it is not limited thereto. For example, it can include different shapes in other embodiments. In addition, the second magnetic element MEG2 can be a multi-pole magnet.

As shown in FIG. 2 and FIG. 3 (the casing 102 is omitted in FIG. 3), the driving coil DCL is disposed around the optical member holder 108 and corresponds to the four second magnetic elements MEG2. When the driving coil DCL is provided with electricity, the four second magnetic elements MEG2 act with the driving coil DCL to generate an electromagnetic driving force, to drive the optical member holder 108 to move relative to the frame 104 along the optical axis O (the Z-axis direction), so that the auto focusing function is performed. In addition, as shown in FIG. 2 and FIG. 3, the first magnetic elements MEG1 can be plate coils which are disposed in the circuit board 118 and correspond to the second magnetic elements MEG2. In the design of the present disclosure, only one second magnetic element MEG2 is needed to correspond to the driving coil DCL and the first magnetic element MEG1 at the same time, so that the number of members in the optical system 100 can be reduced, and the manufacturing cost can be also reduced. Moreover, it should be noted that the first magnetic elements MEG1 (included in the circuit board 118) and the optical member holder 108 are arranged along the optical axis O (the Z-axis direction), and the first magnetic elements MEG1 are disposed around the base opening 1121 of the base 112.

In this embodiment, the circuit board 114 can be a flexible printed circuit (FPC) board, but it is not limited thereto. As shown in FIG. 1 and FIG. 2, the circuit board 114 includes a plurality of electrical contacts 1143, configured to connect a main circuit board (not shown) and the control unit 150 of the aforementioned electronic device. In addition, the circuit board 118 is disposed on the circuit board 114, and the first magnetic elements MEG1 are electrically connected to the circuit board 114. Moreover, the circuit board 114 can further include four electrical contacts 1141, and the top spring sheet 106 can include four electrical connecting portions 106C, which are respectively connected to the four electrical contacts 1141.

As shown in FIG. 2 and FIG. 3, in this embodiment, the sensing unit can include two first sensors SR1, two second sensors SR2, and one third sensor SR3. The first sensors SR1 and the second sensors SR2 can be fixedly disposed in accommodating slots 1122 of the base 112, but they are not limited thereto. For example, they can also be disposed on positions of the circuit board 114 corresponding to the first magnetic elements MEG1. Moreover, as shown in FIG. 2, the projection of the first magnetic element MEG1 on the base 112 surrounds the corresponding first sensor SR1 or the second sensor SR2. The first sensors SR1 and the second sensors SR2 are configured to sense the movement of the corresponding second magnetic elements MEG2. In addition, the third sensor SR3 is disposed at a corner of the optical member holder 108 and is configured to sense a magnet AM. The magnet AM is fixedly disposed on the frame 104 corresponding to the third sensor SR3 at the corner of the optical member holder 108. The positions of the magnet AM and the third sensor SR3 are not limited to this embodiment. In this embodiment, the first sensor SR1, the second sensor SR2, or the third sensor SR3 can be a magnetic field sensing element, such as a Hall effect sensor, a MR sensor, a fluxgate sensor, and so on, but they are not limited thereto.

In this embodiment, the optical member holder 108 and the optical member are disposed in the frame 104 and can move relative to the frame 104. More specifically, as shown in FIG. 3, the optical member holder 108 can be connected to the frame 104 by the top spring sheet 106 and the lower spring sheet 110, so that the optical member holder 108 is suspended in the frame 104. In addition, the optical member holder 108 and the frame 104 are suspended in the fixed frame 103 by the top spring sheet 106. In this embodiment, as shown in FIG. 3, the top spring sheet 106 and the lower spring sheet 110 can be elastic members, and the top spring sheet 106 can include an outer ring portion 1061, a middle ring portion 1062, an inner ring portion 1063, a plurality of connecting portions 1064 and a plurality of connecting portions 1065. The inner ring portion 1063 is fixedly connected to the optical member holder 108, the middle ring portion 1062 is fixedly connected to the frame 104, and the outer ring portion 1061 is fixedly connected to the fixed frame 103. Furthermore, the inner ring portion 1063 is connected to the middle ring portion 1062 by the connecting portions 1065, and the middle ring portion 1062 is connected to the outer ring portion 1061 by the connecting portions 1064.

In addition, as shown in FIG. 2, the structure of the lower spring sheet 110 is similar to the top spring sheet 106. The lower spring sheet 110 includes an outer ring portion 1101, a middle ring portion 1102, an inner ring portion 1103, and a plurality of connecting portions 1104. The outer ring portion 1101 is connected to the middle ring portion 1102 through the plurality of connecting portions 1104, and the middle ring portion 1102 is connected to the inner ring portion 1103 through the plurality of connecting portions 1104. In this embodiment, the inner ring portion 1103 is fixedly connected to the optical member holder 108, the middle ring portion 1102 is fixedly connected to the frame 104, and the outer ring portion 1101 is fixedly connected to the fixed frame 103.

It should be noted that the outer ring portion 1061, the middle ring portion 1062 and the inner ring portion 1063 have a greater elastic coefficient than the connecting portions 1064 and the connecting portions 1065, so that when the driving coil DCL is provided with electricity to act with the second magnetic elements MEG2 to generate an electromagnetic driving force to drive the optical member holder 108 to move relative to the frame 104 along the optical axis O (Z-axis direction), it can ensure that the optical member holder 108 does not easily rotate relative to the frame 104. In addition, the lower spring sheet 110 is configured to help the optical member holder 108 to be more stably suspended in the frame 104. In other embodiments, the optical system can also omit the lower spring sheet 110.

In addition, in this embodiment, as shown in FIG. 3, a first axis Ax and a second axis Ay can be defined between the top spring sheet 106 and the lower spring sheet 110, directions of the first axis Ax and the second axis Ay are respectively parallel to the X-axis direction and the Y-axis direction, and directions of the first axis Ax and the second axis Ay are perpendicular to the optical axis O. More specifically, the first axis Ax and the second axis Ay cross the optical axis O. It should be noted that the first axis Ax and the second axis Ay pass through the optical member holder 108.

Figure 4:
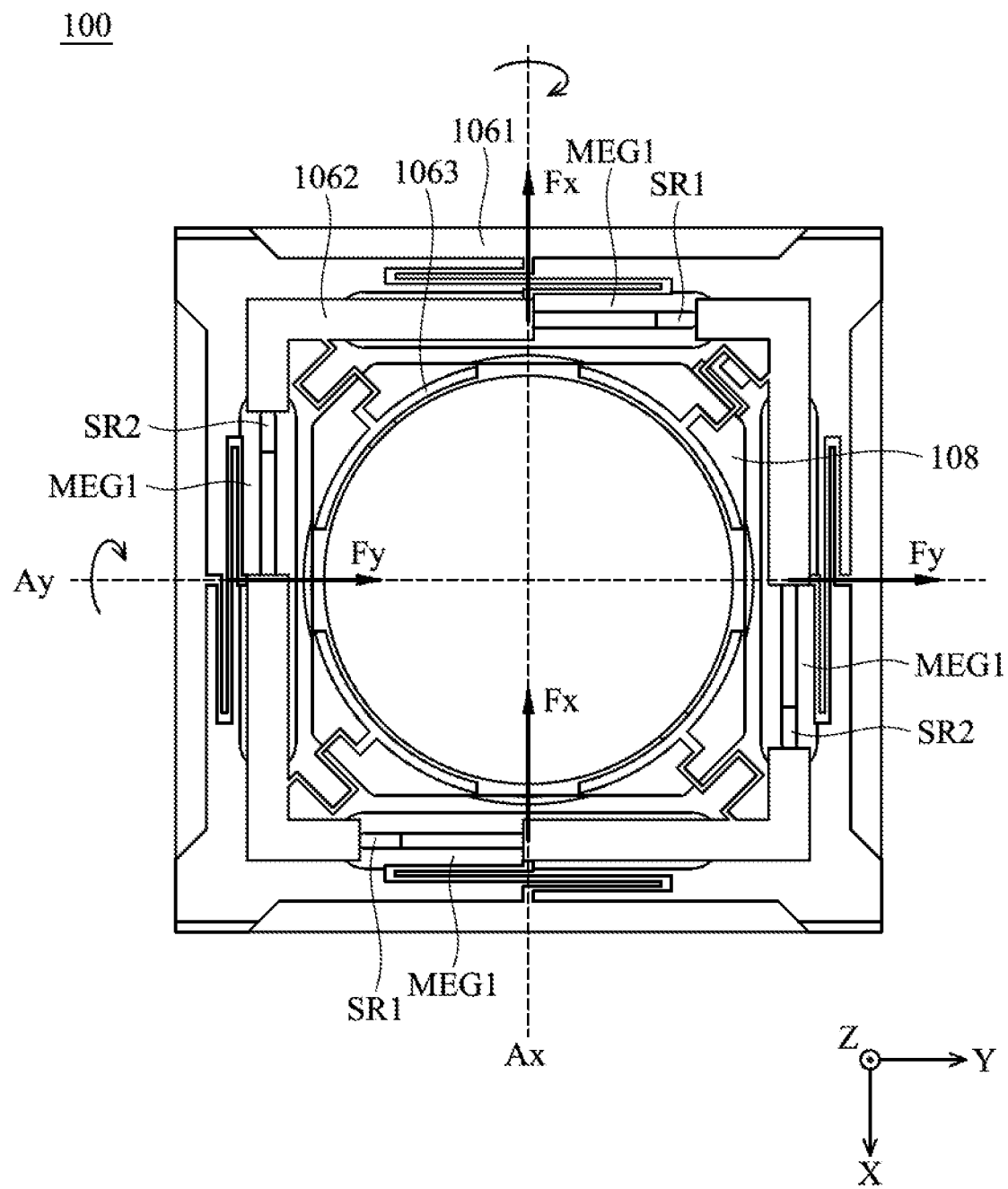
FIG. 4 shows a top view of the optical system according to the embodiment of the present disclosure.

Please refer to FIG. 3 and FIG. 4. FIG. 4 shows a top view of the optical system 100 according to the embodiment of the present disclosure. For clarity, only some members of the optical system 100 are shown in FIG. 4. As shown in FIG. 3 and FIG. 4, the control unit 150 can only control two first magnetic elements MEG1 and two second magnetic elements MEG2 arranged along the Y-axis direction to generate two electromagnetic driving forces Fy. In this embodiment, the two electromagnetic driving forces Fy have the same magnitude and the same directions (along the Y-axis direction). Next, as shown in FIG. 4, because the optical member holder 108 and the frame 104 are respectively connected to the inner ring portion 1063 and the middle ring portion 1062, when the optical member holder 108 and the frame 104 are driven by the two electromagnetic driving forces Fy, the optical member holder 108 and the frame 104 are constrained by the inner ring portion 1063 and the middle ring portion 1062, so that the frame 104 and the optical member holder 108 rotate around the first axis Ax relative to the fixed module (the fixed frame 103). That is, the inner ring portion 1063 and the middle ring portion 1062 are rotated relative to the outer ring portion 1061 around the first axis Ax.

Similarly, as shown in FIG. 4, the control unit 150 can only control two first magnetic elements MEG1 and two second magnetic elements MEG2 arranged along the X-axis direction to generate two electromagnetic driving forces Fx. In this embodiment, the two electromagnetic driving forces Fx have the same magnitude and the same directions (along the −X-axis direction). As shown in FIG. 4, the two electromagnetic driving forces Fx can drive the inner ring portion 1063 and the middle ring portion 1062 to rotate around the second axis Ay relative to the outer ring portion 1061. That is, the electromagnetic driving forces Fx can drive the frame 104 and the optical member holder 108 to rotate around the second axis Ay relative to the fixed module (the fixed frame 103). It should be noted that directions of the electromagnetic driving forces Fx and the electromagnetic driving forces Fy can be opposite to those in FIG. 4. In other embodiments, the control unit 150 can only control the driving assembly to generate a single electromagnetic driving force Fx or a single electromagnetic driving force Fy to drive the optical member holder 108 and the frame 104 to rotate relative to the fixed frame 103.

Figure 5:
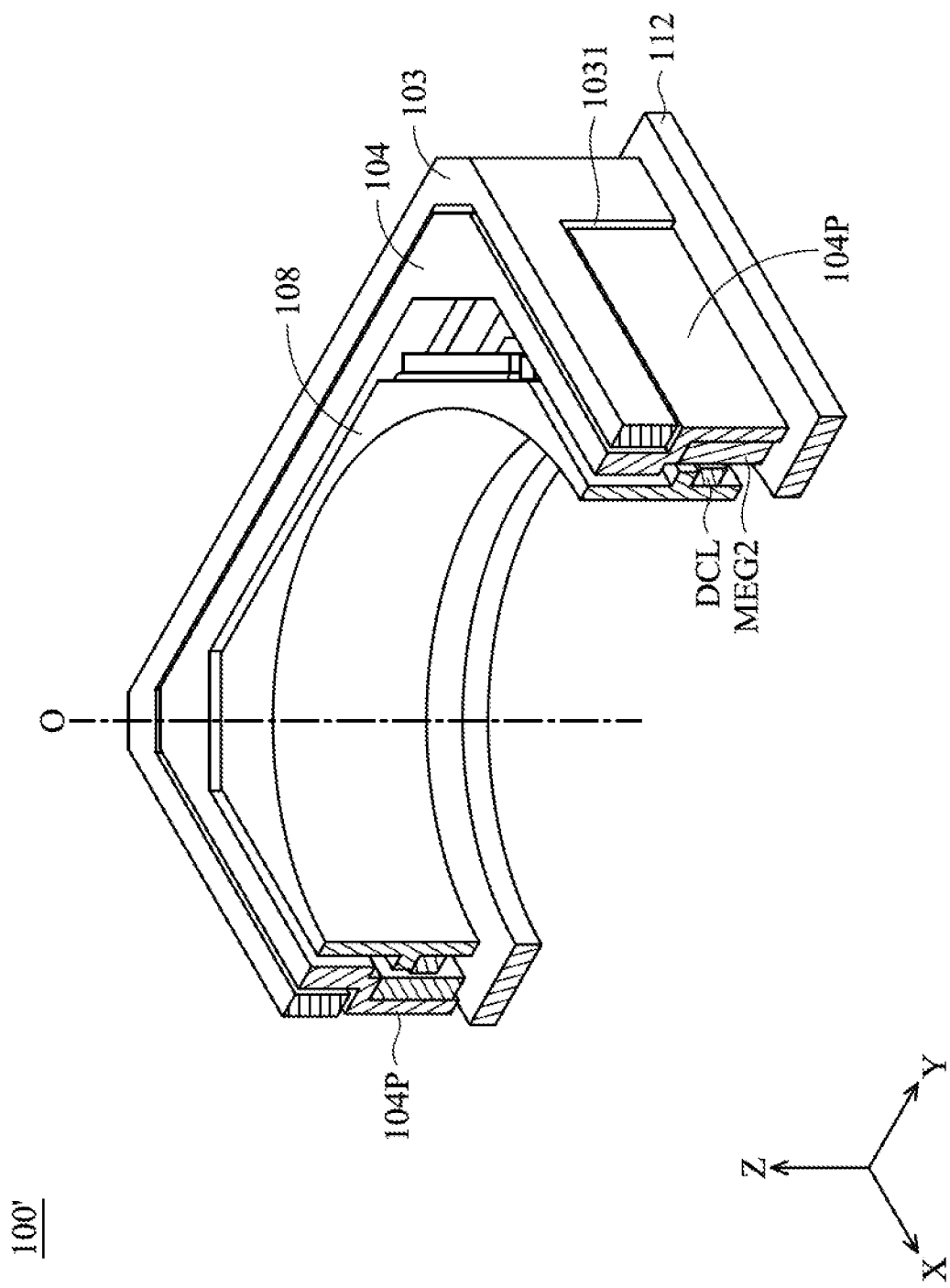
FIG. 5 shows a schematic sectional view of some members of an optical system according to another embodiment of the present disclosure.

Please refer to FIG. 5, which shows a schematic sectional view of some members of an optical system 100' according to another embodiment of the present disclosure. As shown in FIG. 5, the optical system 100' is similar to the optical system 100, and the difference is that the fixed frame 103 partially overlaps the frame 104 when viewed along the optical axis. Specifically, as shown in FIG. 5, the frame 104 can have four protrusions 104P (only two protrusions 104P are shown in the figure due to the viewing angle), and the fixed frame 103 can correspondingly include four openings 1031, configured to accommodate the protrusions 104P. Based on this structural design, the widths of the optical system 100' along the X-axis direction and Y-axis direction can further be reduced, so as to achieve the purpose of miniaturization.

Figure 6:
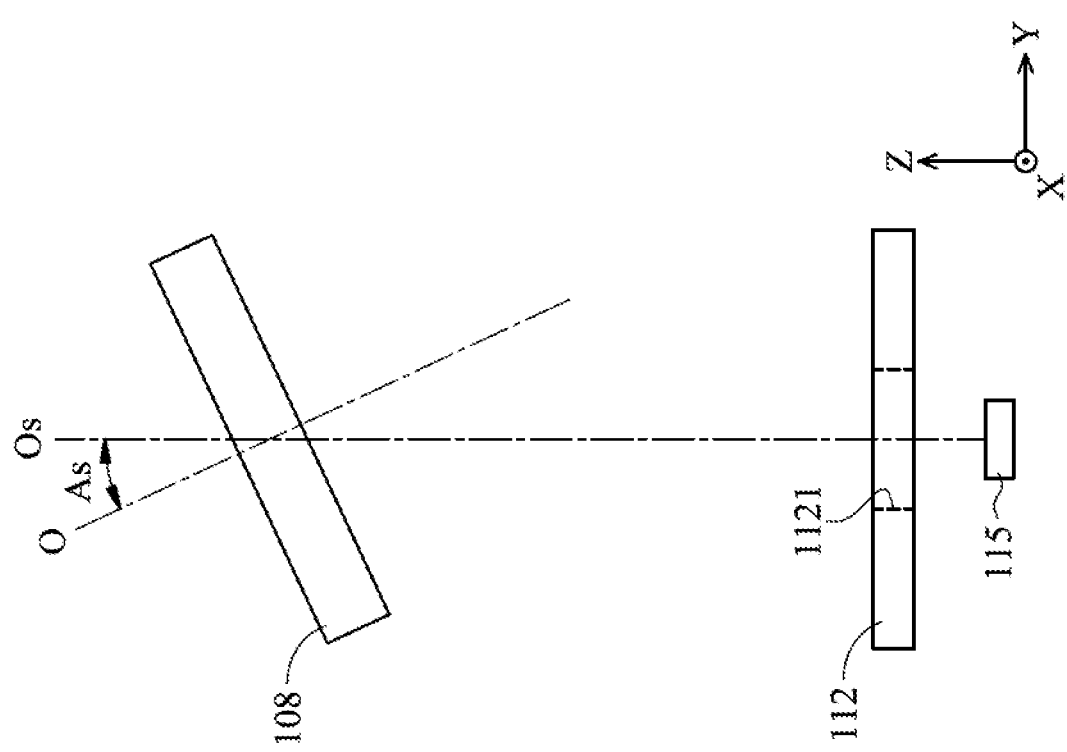
FIG. 6 shows a diagram of the optical member holder, the base and the image-sensing element according to the embodiment of the present disclosure.

Please continue to refer to FIGS. 2, 3 and 6. FIG. 6 shows a diagram of the optical member holder 108, the base 112 and the image-sensing element 115 according to the embodiment of the disclosure. When the optical system 100 is installed on the main circuit board and is not activated, the optical axis O of the optical member holder 108 may not be parallel to an optical axis Os of the image-sensing element 115. For example, an included angle As (angle of tilt) is formed between the optical axis O and the optical axis Os. This situation is called a static tilt, and it can result in an unclear image obtained by the image-sensing element 115. Therefore, in order to compensate for this static tilt, the control unit 150 can control the driving assembly to generate an electromagnetic driving force, to rotate the optical member holder 108 clockwise relative to the first axis Ax, so that the included angle As can be compensated for.

Figure 7:
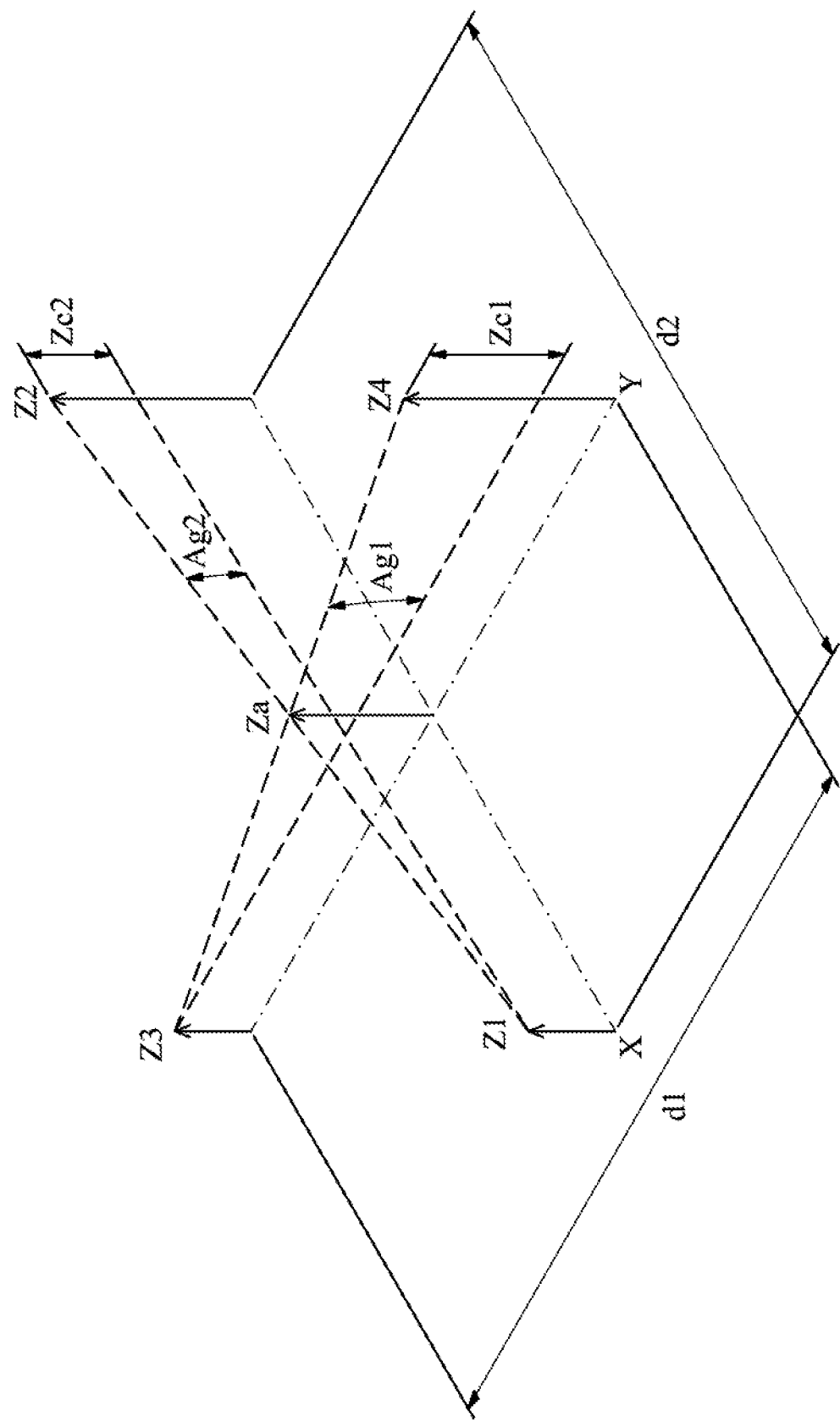
FIG. 7 shows a diagram illustrating that the movement is sensed by the sensing unit in the optical system according to an embodiment of the present disclosure.

Please refer to FIG. 2, FIG. 3 and FIG. 7. FIG. 7 shows a diagram illustrating that the movement is sensed by the sensing unit in the optical system 100 according to an embodiment of the present disclosure. In this embodiment, the magnitudes of the vector Z1 and the vector Z2 respectively represent the displacements of the two second magnetic elements MEG2 along the Z-axis direction which are sensed by the two corresponding first sensors SR1, and the magnitudes of the vectors Z3 and Z4 respectively represent the displacements of the two second magnetic elements MEG2 along the Z-axis direction which are sensed by the two corresponding second sensors SR2. The magnitude of the vector Za represents the displacement of the magnet AM which is sensed by the third sensor SR3.

In this embodiment, the magnitude of the vector Z1 is less than that of the vector Z2, and the magnitude of the vector Z3 is less than that of the vector Z4. Then, the control unit 150 can obtain information related to a first rotation angle of the optical member holder 108 and the frame 104 when rotating around the first axis Ax relative to the fixed module (the frame 103 or the base 112) or a second rotation angle of the optical member holder 108 and the frame 104 when rotating around the second axis Ay relative to the fixed module according to the magnitudes of the vector Z1 to the vector Z4. For example, a first rotation angle Ag1 can be calculated by a distance d1 between the two second magnetic elements MEG2 along the Y-axis direction and the magnitudes of the vector Z3 and the vector Z4 (according to the trigonometric function formula). Then, the control unit 150 can drive the optical member holder 108 and the frame 104 to rotate around the first axis Ax according to the obtained information about the first rotation angle. That is, the control unit 150 controls the driving assembly corresponding to the vector Z3 to generate an electromagnetic driving force toward the Z-axis direction, to control the optical member holder 108 and the frame 104 to rotate, so as to move with a compensation distance Zc1. In this embodiment, Z4=Z3+Zc1.

Similarly, the control unit 150 can also obtain a second rotation angle Ag2 of the optical member holder 108 when rotating around the second axis Ay according to the magnitudes of the vector Z1 and the vector Z2, and correspondingly drive the optical member holder 108 to rotate, to compensate for the second rotation angle. In this embodiment, the control unit 150 can calculate the second rotation angle Ag2 according to a distance d2 between the two second magnetic elements MEG2 along the X-axis direction and the magnitudes of the vector Z1 and the vector Z2 (based on the trigonometric function. formula). Then, the control unit 150 can drive the optical member holder 108 to rotate around the second axis Ay according to the obtained information about the second rotation angle. That is, the control unit 150 controls the driving assembly corresponding to the vector Z1 to generate an electromagnetic driving force toward the Z-axis direction, to control the optical member holder 108 and the frame 104 to rotate, so as to move with a compensation distance Zc2. In this embodiment, Z2=Z1+Zc2. After the optical member holder 108 and the frame 104 are rotated by the two electromagnetic driving forces described above, the optical axis O of the optical member holder 108 can be aligned with the optical axis Os of the image-sensing element 115 (as shown in FIG. 6), so as to achieve the purpose of compensating for the tilt.

It should be noted that the storage unit 170 of the control unit 150 can store an angle-displacement table in advance. In this embodiment, the angle-displacement table can be a data table including the first rotation angle, the second rotation angle and the corresponding compensation distance. For example, when the control unit 150 determines that the optical member holder 108 rotates the first rotation angle Ag1 and/or the second rotation angle Ag2, the control unit 150 can refer to the angle-displacement table and directly controls the driving assembly to drive the optical member holder 108 to move the corresponding compensation distance Zc1 and/or the compensation distance Zc2.

In addition, the control unit 150 can also store initial information related to the optical member holder 108. The initial information includes the position information and the angle information of the optical member holder 108 when the optical member holder 108 is not activated. For example, as shown in FIG. 7, the position information can include the vector Za in FIG. 7, and the angle information can include, for example, the first rotation angle Ag1 or the second rotation angle Ag2. Therefore, when the optical system 100 is activated, the control unit 150 can immediately drive the optical member holder 108 to compensate for the displacement and the angle of tilt according to the position information and the angle information, so that the optical axis O of the optical member holder 108 is aligned with the optical axis Os of the image-sensing element 115. That is, the control unit 150 can immediately perform the procedure of compensating for the static tilt when the optical system 100 is activated.

Figure 8:
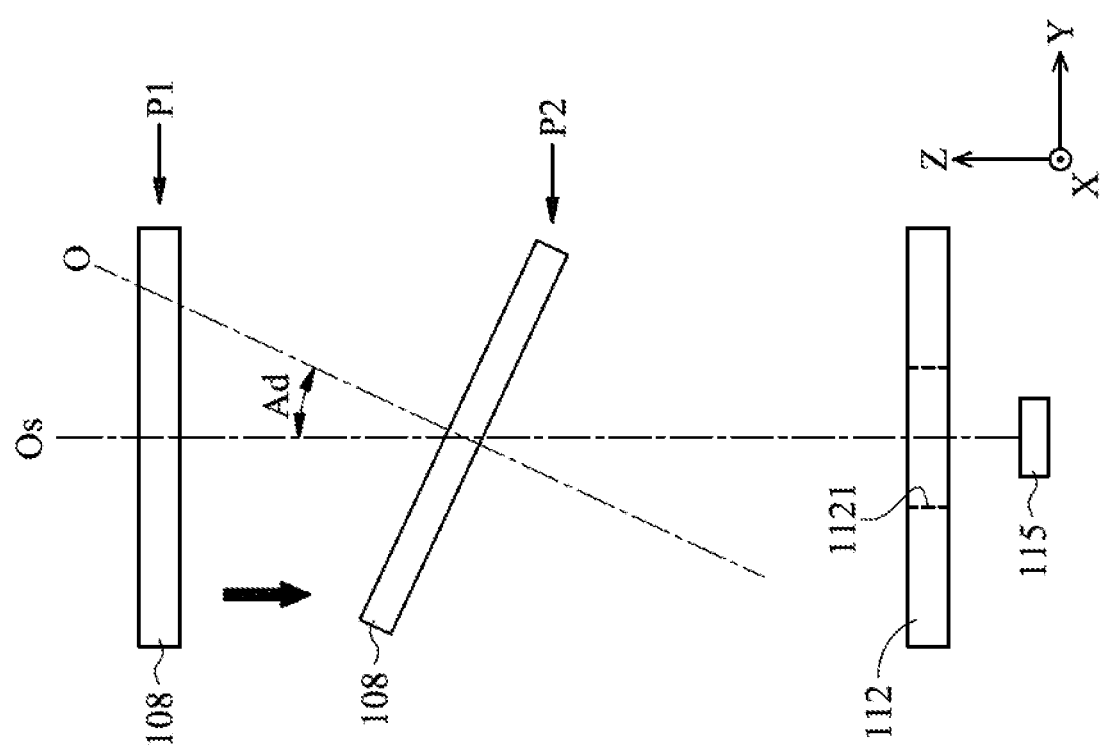
FIG. 8 shows a diagram illustrating that the optical member holder is located at different positions relative to the image-sensing element in FIG. 2 according to the embodiment of the present disclosure.

Please refer to FIG. 8, which shows a diagram illustrating that the optical member holder 108 is located at different positions relative to the image-sensing element 115 in FIG. 2 according to the embodiment of the present disclosure. As shown in FIG. 8, when the optical member holder 108 is driven to move along the Z-axis direction, there can be a problem of a dynamic tilt. For example, when the optical member holder 108 is moved from the position P1 to the position P2, the optical member holder 108 is tilted at the position P2, so that an included angle Ad is formed between the optical axis O and the optical axis Os. For solving this problem, the control unit 150 can further store dynamic information related to the movable module (such as the optical member holder 108 and the frame 104), and the dynamic information includes position variation information and angle variation information about the movable module when it operates within a predetermined range. That is, the dynamic information includes information about angles corresponding to the optical member holder 108 at different positions along the Z-axis direction. In this embodiment, the predetermined range is defined as a range to ensure that the driving assembly can effectively control the optical member holder 108. For example, in FIG. 8, the position P1 is an upper limit position of the predetermined range. When the position of the optical member holder 108 is lower than the position P1, it can be ensured that the driving assembly can effectively control the optical member holder 108.

As a result, based on the design of the control unit 150 storing the dynamic information related to the movable module in advance, when the optical member holder 108 is moved to different positions along the Z-axis direction and the dynamic tilt is occurred, the control unit 150 can instantly control the driving assembly to compensate for this dynamic tilt, so that the optical axis O can be aligned with the optical axis Os. In addition, it should be noted that when the control unit 150 compensates for the dynamic tilt, the control unit 150 can choose a certain position of the optical member holder 108 to serve as a reference point. For example, as shown in FIG. 8, when the optical member holder 108 is at the highest point (the position P1), the optical axis O of the optical member holder 108 is aligned with the optical axis Os of the image-sensing element 115. Therefore, the control unit 150 can choose position P1 to serve as the reference point, and then can perform a procedure to compensate for the dynamic tilt of optical member holder 108 at other positions.

Figure 9:
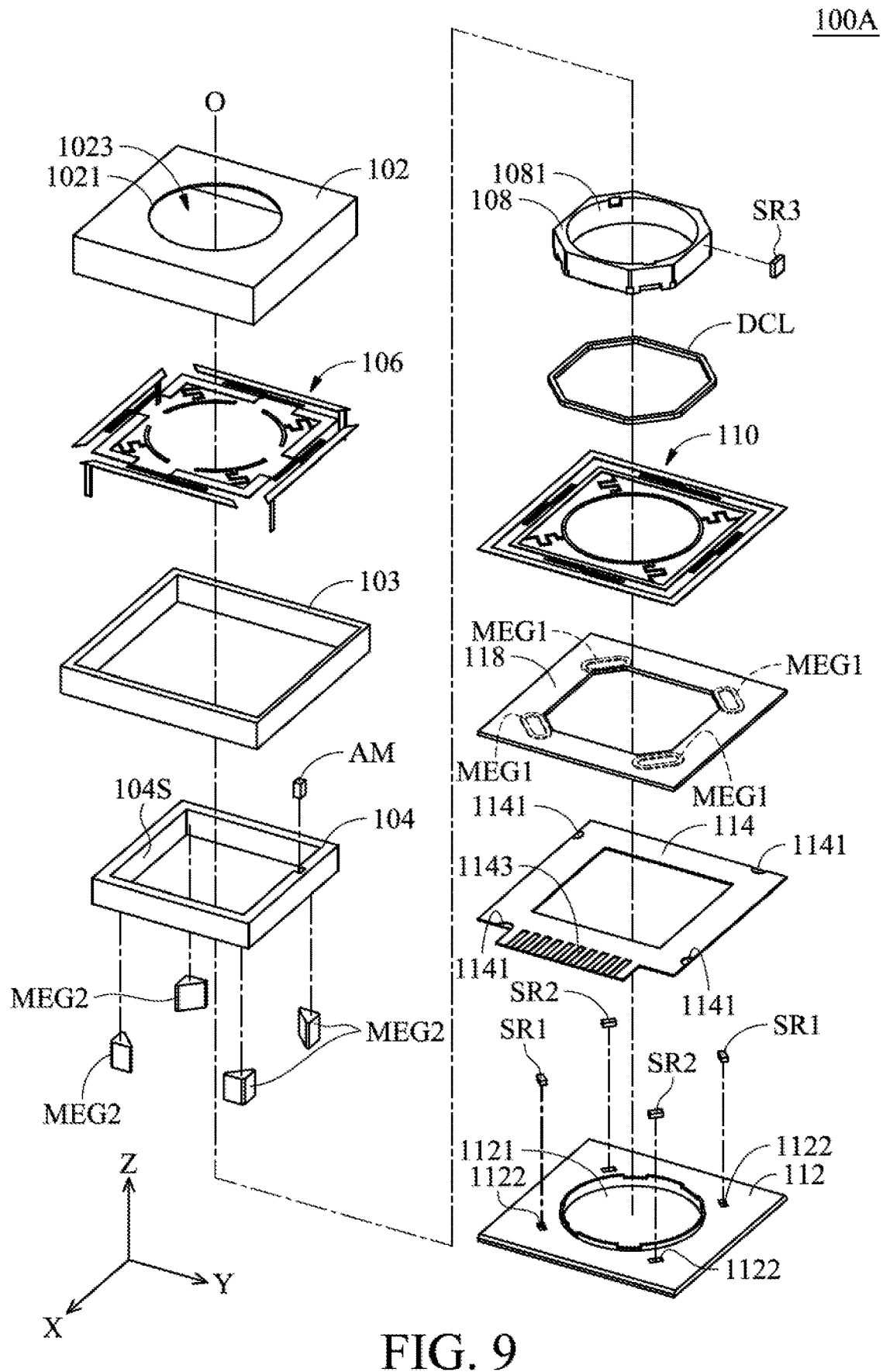
FIG. 9 shows an exploded diagram of an optical system according to another embodiment of the present disclosure.

Please refer to FIG. 9, which shows an exploded diagram of an optical system 100A according to another embodiment of the present disclosure. The optical system 100A of this embodiment is similar to the optical system 100, and the difference between these two embodiments is that the four second magnetic elements MEG2 have a triangular prism structure, and the base 112 has a rectangular structure. The four second magnetic elements MEG2 are disposed at corners of an inner wall surface 104S of the frame 104. In addition, the four first magnetic elements MEG1, the two first sensors SR1, and the two second sensors SR2 are disposed at the positions corresponding to the second magnetic elements MEG2. That is, the driving assembly and the sensing unit are disposed on the corner of the base 112.

Figure 10:
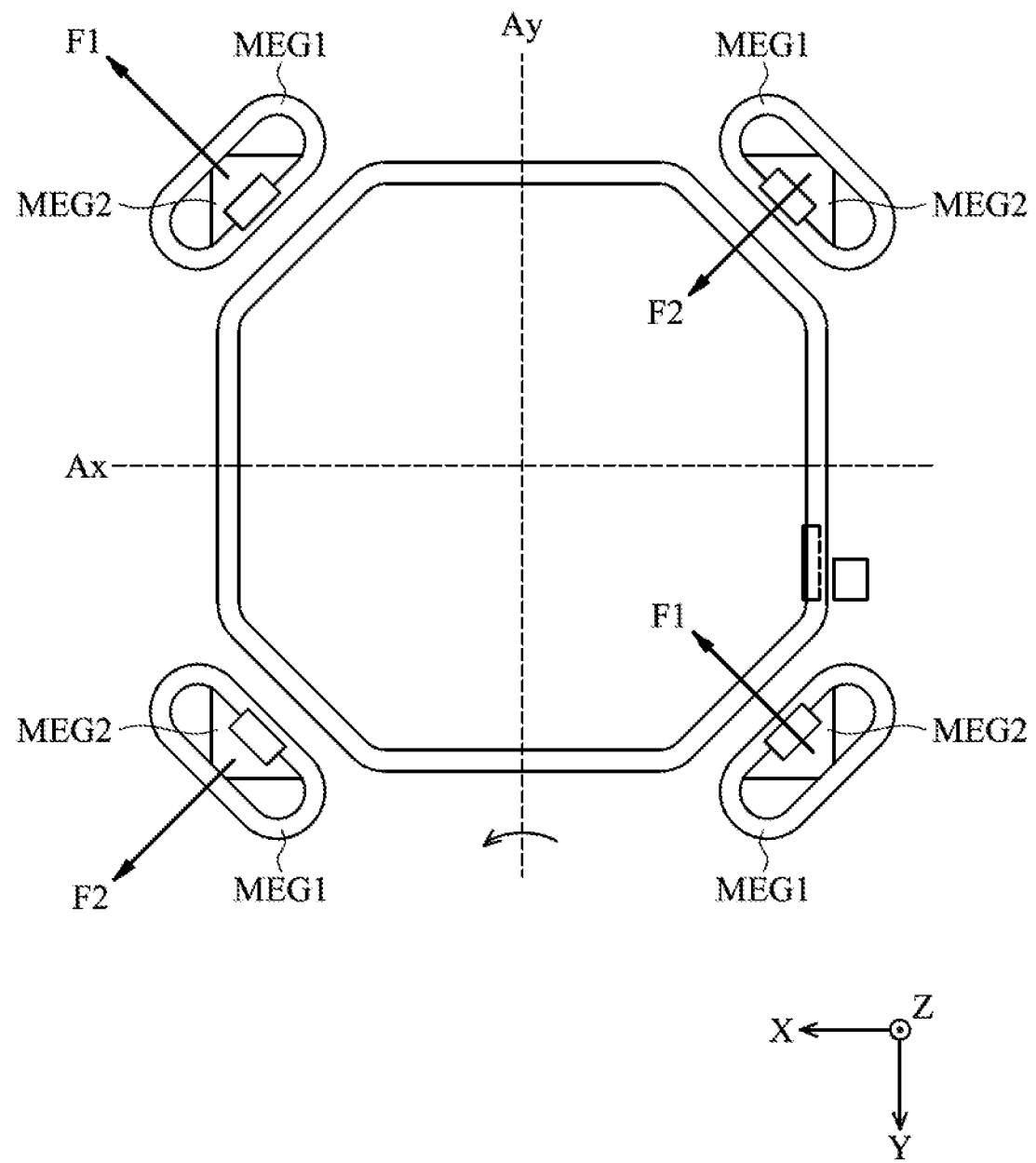
FIG. 10 and FIG. 11 are top views of some members of the optical system in FIG. 9 according to the embodiment of the present disclosure.
Figure 11:
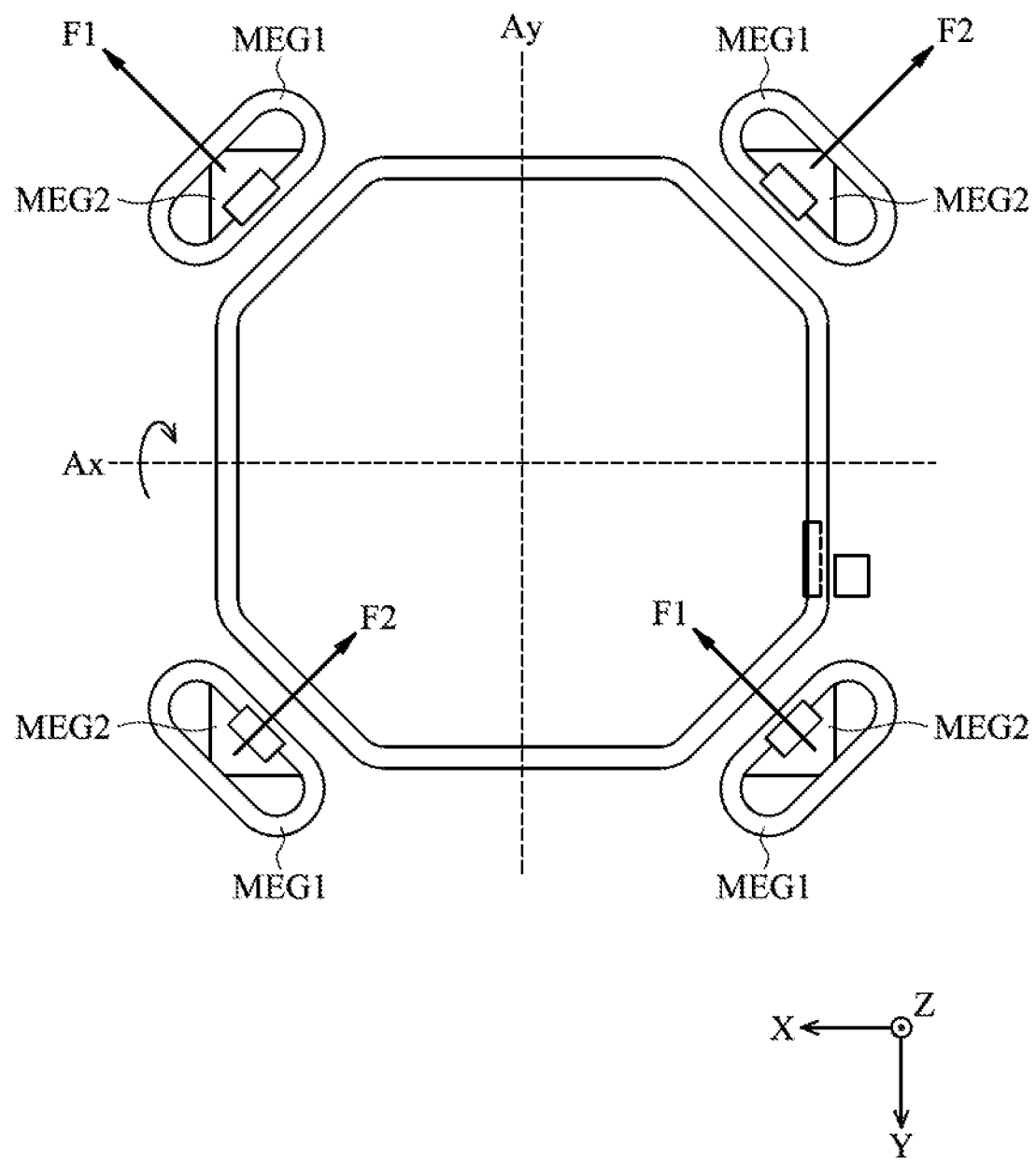

Please refer to FIG. 9 to FIG. 11 together. FIG. 10 and FIG. 11 are top views of some members of the optical system 100A in FIG. 9 according to the embodiment of the present disclosure. As shown in FIG. 10, the first magnetic element MEG1 and the second magnetic element MEG2 respectively on the upper left corner and the lower right corner generate two electromagnetic driving forces F1, and the two electromagnetic driving forces F1 have the same direction. The first magnetic element MEG1 and the second magnetic element MEG2 respectively on the lower left corner and the upper right corner generate two electromagnetic driving forces F2 which have the same direction, and the magnitude of the electromagnetic driving force F1 is the same as the magnitude of the electromagnetic driving force F2. Because the direction of the resultant force of the electromagnetic driving force F1 and the electromagnetic driving force F2 is along the X-axis direction, this resultant force can drive the frame 104 and the optical member holder 108 to rotate around the second axis Ay relative to the fixed module (the fixed frame 103).

Similarly, as shown in FIG. 11, the direction of the electromagnetic driving force F2 in FIG. 11 is opposite to the direction of the electromagnetic driving force F2 in FIG. 10, and thus the direction of the resultant force of the electromagnetic driving force F1 and the electromagnetic driving force F2 is along the -Y-axis direction. Therefore, this resultant force can drive the frame 104 and the optical member holder 108 to rotate around the first axis Ax relative to the fixed frame 103. As a result, the control unit 150 can control the rotation directions of the optical member holder 108 and the frame 104 by adjusting the directions of the electromagnetic driving force F1 and the electromagnetic driving force F2.

Next, similar to the optical system 100 in the previous embodiment, when the optical member holder 108 and the frame 104 are tilted, the control unit 150 can perform the procedure of compensation for the tilting according to the information about the first rotation angle and the second rotation angle obtained by the first sensors SR1 and the second sensors SR2. The method of controlling the optical member holder 108 and the frame 104 to rotate by the control unit 150 to compensate for the tilting is similar to that of the previous embodiment, and therefore the description is omitted herein.

Figure 12:
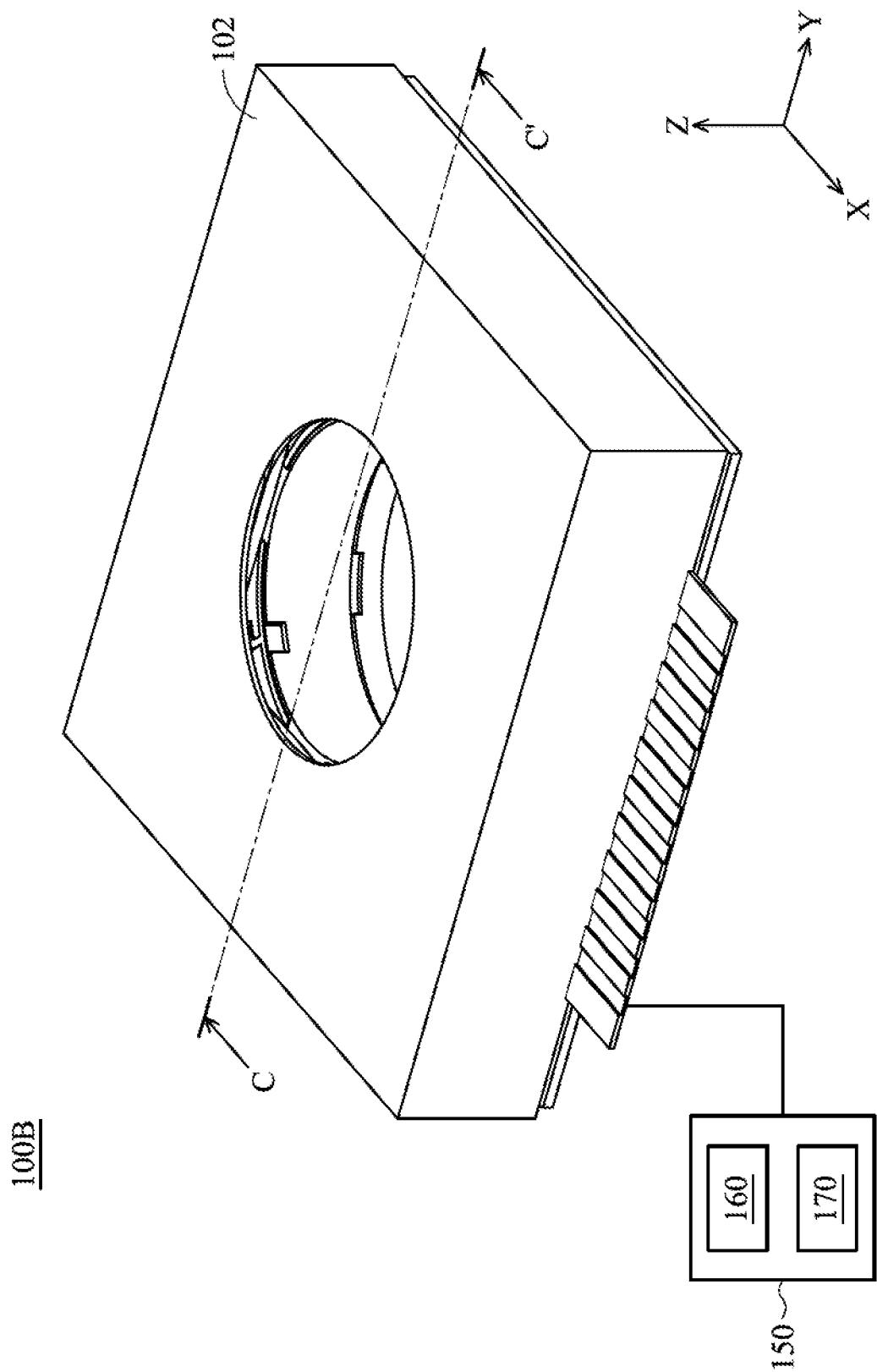
FIG. 12 shows a schematic diagram of an optical system according to another embodiment of the present disclosure.
Figure 13:
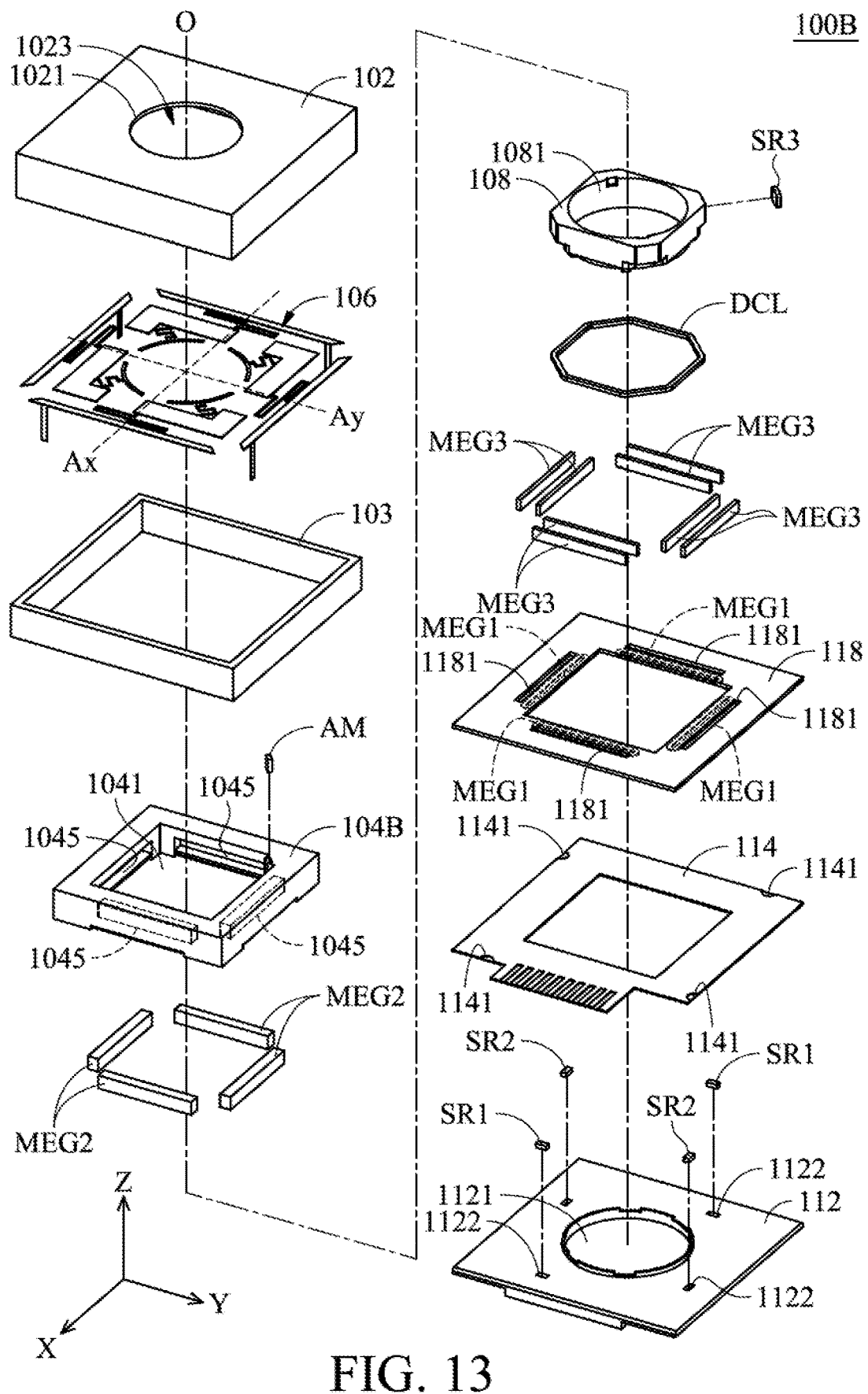
FIG. 13 shows an exploded diagram of the optical system according to another embodiment of the present disclosure.
Figure 14:
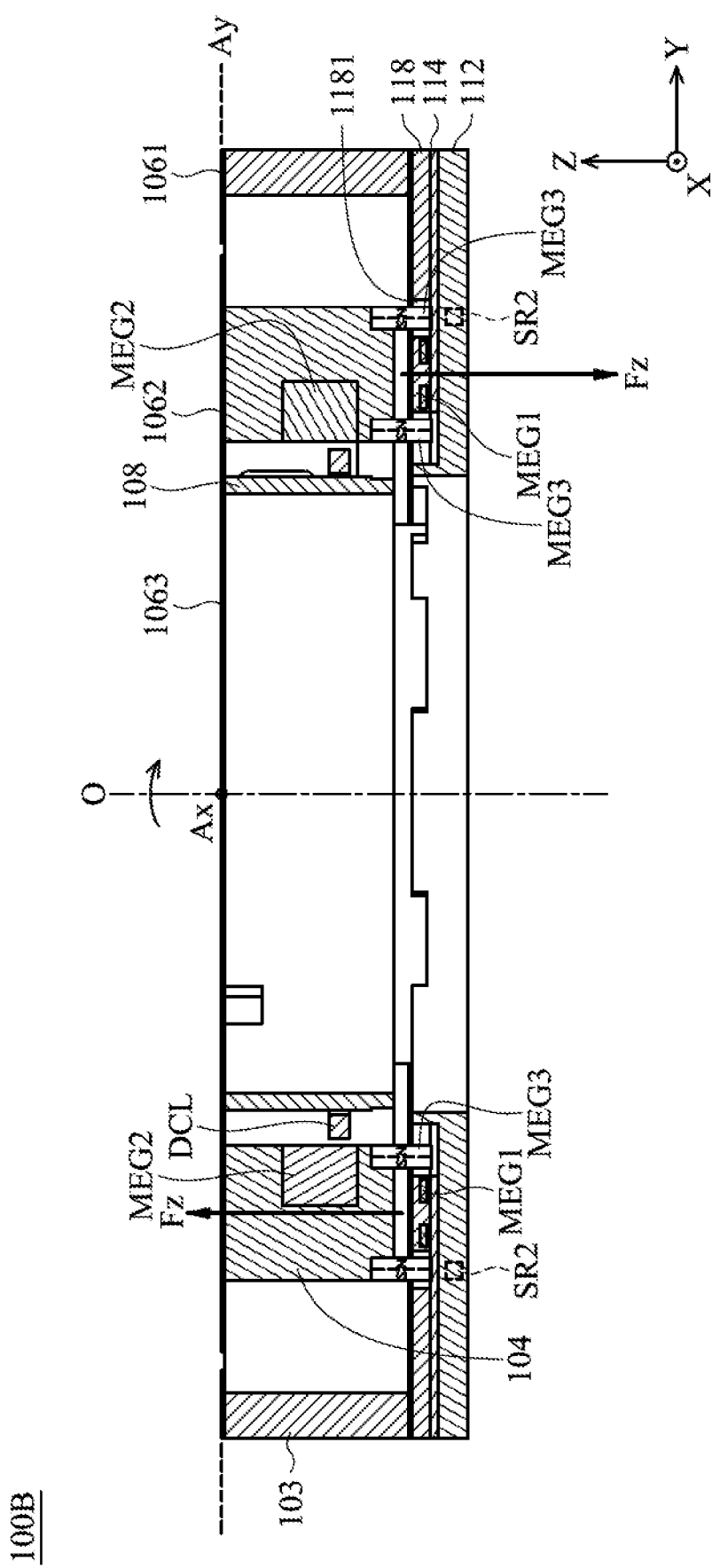
FIG. 14 shows a cross-sectional view along line C-C' in FIG. 12 according to the embodiment of the present disclosure.

Please refer to FIG. 12 to FIG. 14. FIG. 12 shows a schematic diagram of an optical system 100B according to another embodiment of the present disclosure, FIG. 13 shows an exploded diagram of the optical system 100B according to another embodiment of the present disclosure, and FIG. 14 shows a cross-sectional view along line C-C' in FIG. 12 according to the embodiment of the present disclosure. As shown in FIG. 13, the optical system 100B in this embodiment is similar to the optical system 100, and the difference is that an inner side of a frame 104B of the optical system 100B has four grooves 1045 configured to accommodate the four second magnetic elements MEG2. In addition, the driving assembly of the optical system 100B can further include a plurality of magnetic elements MEG3, and the magnetic elements MEG3 are disposed around the optical member holder 108. In this embodiment, the driving assembly can include eight magnetic elements MEG3 which are disposed at the four sides of the bottom of the optical member holder 108. In this embodiment, every two magnetic elements MEG3 are disposed at one side of the bottom of the optical member holder 108.

As shown in FIG. 13 and FIG. 14, the circuit board 118 can further include four slots 1181, and the outermost magnetic element MEG3 is configured to pass through the slot 1181 and to be in contact with the circuit board 114. In addition, as shown in FIG. 14, the first magnetic element MEG1 (the coil) is located between two corresponding magnetic elements MEG3. Furthermore, the two first sensors SR1 and the two second sensors SR2 are disposed below the magnetic elements MEG3. For example, as shown in FIG. 14, the second sensor SR2 is located below the outermost magnetic element MEG3, and the second sensor SR2 is configured to sense the displacement of the corresponding magnetic element MEG3.

Similar to the previous embodiment, when the driving coil DCL is provided with electricity, the four second magnetic elements MEG2 act with the driving coil DCL to generate an electromagnetic driving force, thereby driving the optical member holder 108 to move along the optical axis O (the Z-axis direction) relative to the frame 104, so as to perform auto focusing function. In addition, when the compensation for tilting needs to be performed, the first magnetic elements MEG1 can be provided with electricity and act with the magnetic elements MEG3 to generate a driving force parallel to the optical axis O, so as to drive the optical member holder 108 and the frame 104 to rotate relative to the fixed frame 103.

For example, as shown in FIG. 14, the control unit 150 can provide electricity to the two first magnetic elements MEG1 arranged along the Y-axis direction, and the currents received by the two first magnetic elements MEG1 have the same magnitude but opposite phase. Therefore, as shown in FIG. 14, the first magnetic element MEG1 and the magnetic element MEG3 at the left side are induced to generate an electromagnetic driving force Fz toward the Z-axis direction, and the first magnetic element MEG1 and the magnetic element MEG3 at the right side are induced to generate an electromagnetic driving force Fz toward the -Z-axis direction. As a result, the optical member holder 108 and the frame 104 are driven to rotate around the first axis Ax relative to the fixed frame 103 by the two electromagnetic driving forces Fz.

Similarly, if the control unit 150 only provides electricity to the two first magnetic elements MEG1 arranged along the X-axis direction, the generated electromagnetic driving force will drive the optical member holder 108 and the frame 104 to rotate around the second axis Ay.

It should be noted that, in FIG. 14, the control unit 150 can also control only the first magnetic element MEG1 at the left side to generate the electromagnetic driving force Fz along the Z-axis direction, or control the electromagnetic driving force along the Z-axis direction generated by the first magnetic element MEG1 at the left side to be greater than the electromagnetic driving force along the Z-axis direction generated by the first magnetic element MEG1 at the right side. Therefore, the optical member holder 108 and the frame 104 can also be driven to rotate around the first axis Ax relative to the fixed frame 103.

In addition, in other embodiments, the second magnetic elements MEG2 and the driving coil DCL of the optical system 100B can be omitted, and the control unit 150 can control the four first magnetic elements MEG1 and the magnetic element MEG3 to generate four electromagnetic driving force with the same magnitude and the same direction (the direction of the electromagnetic driving force is parallel to the optical axis O), so that the optical member holder 108 can be driven to move along the Z-axis direction. Based on this configuration, the manufacturing cost of the optical system 100B can be further reduced.

In addition, similar to the previous embodiment, when the optical member holder 108 and the frame 104 are tilted, the control unit 150 can perform the compensation for tilting according to the angle information (such as the first rotation angle and the second rotation angle described above) obtained by the first sensors SR1 and the second sensors SR2. The method of controlling the optical member holder 108 to rotate by the control unit 150 to compensate for the tilting is similar to that of the previous embodiment, and therefore the description is omitted herein.

Please refer to FIG. 15, which shows a side view of an optical system 200 according to another embodiment of the present disclosure. In this embodiment, the optical system 200 can have the structural configuration in any of the previous embodiments (e.g., including all of the members in the optical system 100). As shown in FIG. 15, the optical system 200 can include an optical member holder 208, a circuit board 218 (plate coils), and a base 212. In this embodiment, the optical member holder 208 is configured to hold an optical member (such as a lens), and the optical axis O of the optical member is parallel to the Y-axis direction. In addition, the optical system 200 further includes an optical axis adjustment member 250. The optical axis adjustment member 250 can be a reflecting mirror configured to change an incident light L along the −Z-axis direction to a direction parallel to the optical axis O. In this embodiment, the direction of the incident light L is not parallel to the direction of the optical axis O.

In this embodiment, the optical system 200 can also use the electromagnetic driving force to compensate for the tilt of the optical member holder 208 relative to the image-sensing element (located at the right side of the base 212, not shown). In addition, the optical system 200 can also have a driving mechanism (not shown) configured to rotate the optical axis adjustment member 250, to adjust the incident angle of a reflected light L', so that the reflected light L' can be aligned with the optical axis O.

In this embodiment, the optical axis adjustment member 250, the optical member holder 208, the circuit board 218, and the base 212 are arranged along the optical axis O. Because the circuit board 218 is disposed between the optical member holder 208 and the base 212 instead of being disposed around the optical member holder 208 (such as being disposed on two sides of the optical member holder 208 along the Z-axis direction), the height H of the optical system 200 along the Z-axis direction can be reduced, so as to achieve the purpose of miniaturization.

Please refer to FIG. 16, which shows a side view of an optical system 200A according to another embodiment of the present disclosure. The optical system 200A is similar to the optical system 200 described above. The difference between the optical system 200A and the optical system 200 is that the base 212 and the circuit board 218 of the optical system 200A are disposed between the optical axis adjustment member 250 and the optical member holder 208. Based on this structural configuration, the length Ly of the optical system 200A along the Y-axis direction can be further reduced, so as to achieve the purpose of miniaturization.

In conclusion, the present disclosure provides an optical system including a sensing unit, a driving assembly and a control unit. When the optical member holder is tilted relative to the image-sensing element (e.g., the tilting of the optical system is resulting from a shaking or the mechanical tolerances), the optical axis of the optical member holder may not be aligned with the optical axis of the image-sensing element 115. At this time, the sensing unit can obtain information related to the first rotation angle of the optical member holder when rotating around the first axis and/or the second rotation angle of the optical member holder when rotating around the second axis, and then the control unit 150 can control the driving assembly to drive the optical member holder to rotate according to the information, to compensate for the angle of tilt.

In some embodiments of the present disclosure, the optical member holder has a rectangular structure, and the first magnetic elements MEG1 and the second magnetic elements MEG2 of the driving assembly are disposed at four sides of the optical member holder. Based on this structural configuration, the driving assembly can provide a greater electromagnetic driving force to drive the optical member holder to move or to drive the optical member holder and the frame to rotate relative to the fixed module. In other embodiments of the present disclosure, when the optical system needs to hold a larger optical member, the optical member holder can be designed to have an octagonal structure, and the first magnetic elements MEG1 and the second magnetic elements MEG2 of the driving assembly are disposed at four corners of the optical member holder, so that the optical member holder can hold a larger optical member.

In addition, in some embodiments, the design of the present disclosure can also be applied to a periscope optical system. In these embodiments, because the plate coil is disposed between the optical member holder and the base, the height of the optical system along the Z-axis direction can be reduced, so as to achieve the purpose of miniaturization. In addition, in other embodiments, the base and the plate coil are disposed between the optical axis adjusting member (the reflecting mirror) and the optical member holder. Based on this configuration, the length of the optical system can be further reduced, to further achieve the purpose of miniaturization.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
    a fixed module, comprising a base;
    a movable module, comprising an optical member holder, wherein the optical member holder is configured to hold an optical member;
    a first connecting element, wherein the movable module is movably connected to the fixed module by the first connecting element;
    a sensing unit, configured to obtain information related to a first rotation angle of the optical member holder when rotating around a first axis relative to the base and a second rotation angle of the optical member holder when rotating around a second axis relative to the base, wherein the sensing unit is configured to output a sensing signal to a control unit; and
    a driving assembly, configured to receive a driving signal from the control unit to generate a driving force to drive the movable module to move relative to the fixed module, and the driving assembly comprising a coil, wherein the coil and the movable module are arranged along a direction parallel to an optical axis of the optical member, and the coil is disposed around an opening of the base;
    wherein the first axis or the second axis is perpendicular to the optical axis;
    wherein when viewed along the optical axis, a connecting line of a center of the first connecting element and the optical axis is neither parallel to nor perpendicular to a direction of the driving force.

2. The optical system as claimed in claim 1, wherein the driving assembly generates the driving force according to the information related to first rotation angle and the second rotation angle, to drive the optical member holder to rotate around the first axis or the second axis.

3. The optical system as claimed in claim 2, wherein the optical system further comprises an elastic member and a frame, the elastic member includes an inner ring portion, a middle ring portion and an outer ring portion, the inner ring portion is connected to the optical member holder, the middle ring portion is connected to the frame, and the outer ring portion is connected to the fixed module;
    wherein the inner ring portion and the middle ring portion rotate relative to the outer ring portion around the first axis or the second axis.

4. The optical system as claimed in claim 2, wherein the driving force is substantially perpendicular to the optical axis.

5. The optical system as claimed in claim 1, wherein the base includes a rectangular structure, and the coil of the driving assembly is disposed at one corner of the base.

6. The optical system as claimed in claim 5, wherein the driving assembly further comprises a magnetic element disposed at the corner of the base, and the magnetic element includes a triangular prism structure.

7. The optical system as claimed in claim 1, wherein the fixed module further comprises a fixed frame, and the optical system further comprises a frame, and the fixed frame partially overlaps the frame when viewed along the optical axis.

8. The optical system as claimed in claim 1, wherein the first axis and the second axis pass through the optical member holder.

9. The optical system as claimed in claim 1, wherein the driving assembly further comprises a driving coil, disposed around the optical member holder.

10. The optical system as claimed in claim 1, wherein the driving assembly further comprises two magnetic elements which are disposed on one side of the optical member holder, and the coil is disposed on the side and is located between the two magnetic elements.

11. The optical system as claimed in claim 10, wherein the driving assembly is configured to generate a driving force which is parallel to the optical axis.

12. The optical system as claimed in claim 1, wherein the optical system further comprises an optical axis adjustment member which is configured to change an incident light to a direction parallel to the optical axis, the optical axis adjustment member and the base are arranged along the optical axis, and the incident light is not parallel to the optical axis.

13. The optical system as claimed in claim 12, wherein the base is disposed between the movable module and the optical axis adjustment member.

14. The optical system as claimed in claim 1, wherein the driving assembly further comprises at least one magnetic element, and the magnetic element includes a long-strip structure.

15. The optical system as claimed in claim 14, wherein the magnetic element is a multi-pole magnet.

* * * * *